US008787632B2

(12) United States Patent
Dean et al.

(10) Patent No.: US 8,787,632 B2
(45) Date of Patent: Jul. 22, 2014

(54) APPARATUS AND METHOD FOR REDUCING NOISE IN FINGERPRINT SENSING CIRCUITS

(71) Applicant: Synaptics Incorporated, San Jose, CA (US)

(72) Inventors: Gregory Lewis Dean, Phoenix, AZ (US); Richard Alexander Erhart, Tempe, AZ (US); Jaswinder Jandu, Chandler, AZ (US); Erik Jonathon Thompson, Phoenix, AZ (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 13/965,978

(22) Filed: Aug. 13, 2013

(65) Prior Publication Data

US 2014/0016838 A1 Jan. 16, 2014

Related U.S. Application Data

(63) Continuation of application No. 13/372,153, filed on Feb. 13, 2012, now Pat. No. 8,520,913, which is a continuation of application No. 12/098,367, filed on Apr. 4, 2008, now Pat. No. 8,116,540.

(51) Int. Cl.
G06K 9/28 (2006.01)
G06K 9/36 (2006.01)

(52) U.S. Cl.
USPC ........................................................ 382/124

(58) Field of Classification Search
None
See application file for complete search history.

(56) References Cited

U.S. PATENT DOCUMENTS 3,593,319 A 7/1971 Barber
4,151,512 A 4/1979 Rigannati et al.
4,225,850 A 9/1980 Chang et al.
4,310,827 A 1/1982 Asi (Continued)

FOREIGN PATENT DOCUMENTS

DE 2213813 A1 10/1973
EP 0791899 A2 8/1997

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

Primary Examiner — Brian P Werner
(74) Attorney, Agent, or Firm — Shartsis Friese LLP; Cecily Anne O'Regan; William C. Cray

(57) ABSTRACT

An apparatus for reducing noise in fingerprint sensing circuits is disclosed in one embodiment of the invention as including a fingerprint sensing area onto which a user can apply a fingerprint. An analog front end is coupled to the fingerprint sensing area and is configured to generate an analog response signal. An analog-to-digital converter (ADC) samples the analog response signal and converts the sample to a digital value, which may be received by a digital device such as a processor or CPU. To reduce the amount of the noise that is present in the analog response signal and therefore reflected in the digital value, the digital device may be shut down while the ADC is sampling the analog response signal.

27 Claims, 5 Drawing Sheets

(56) References Cited

U.S. PATENT DOCUMENTS

| | | |
|---|---|---|
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,582,985 A | 4/1986 | Loftberg |
| 4,675,544 A | 6/1987 | Shrenk |
| 4,758,622 A | 7/1988 | Gosselin |
| 4,817,183 A | 3/1989 | Sparrow |
| 5,076,566 A | 12/1991 | Kriegel |
| 5,079,949 A | 1/1992 | Tamori |
| 5,109,427 A | 4/1992 | Yang |
| 5,140,642 A | 8/1992 | Hsu et al. |
| 5,270,949 A | 12/1993 | Atherton et al. |
| 5,305,017 A | 4/1994 | Gerpheide |
| 5,319,323 A | 6/1994 | Fong |
| 5,325,442 A | 6/1994 | Knapp |
| 5,359,243 A | 10/1994 | Norman |
| 5,420,936 A | 5/1995 | Fitzpatrick et al. |
| 5,422,807 A | 6/1995 | Mitra et al. |
| 5,429,006 A | 7/1995 | Tamori |
| 5,456,256 A | 10/1995 | Schneider et al. |
| 5,515,738 A | 5/1996 | Tamori |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,828,773 A | 10/1998 | Setlak et al. |
| 5,838,306 A | 11/1998 | O≠Connor |
| 5,844,287 A | 12/1998 | Hassan et al. |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A | 1/1999 | Upton |
| 5,872,531 A * | 2/1999 | Johnson et al. ............... 341/110 |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,963,679 A | 10/1999 | Setlak |
| 5,995,630 A | 11/1999 | Borza |
| 5,999,637 A | 12/1999 | Toyoda et al. |
| 6,002,389 A | 12/1999 | Kasser |
| 6,002,815 A | 12/1999 | Immega et al. |
| 6,011,859 A | 1/2000 | Kalnitsky et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,327,376 B1 | 12/2001 | Harkin |
| 6,330,345 B1 | 12/2001 | Russo et al. |
| 6,332,193 B1 | 12/2001 | Glass et al. |
| 6,333,989 B1 | 12/2001 | Borza |
| 6,337,919 B1 | 1/2002 | Dunton |
| 6,343,162 B1 | 1/2002 | Saito et al. |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,459,804 B2 | 10/2002 | Mainguet |
| 6,473,072 B1 | 10/2002 | Comiskey et al. |
| 6,481,294 B2 | 11/2002 | Zellner et al. |
| 6,509,501 B2 | 1/2003 | Eicken et al. |
| 6,512,381 B2 | 1/2003 | Kramer |
| 6,525,547 B2 | 2/2003 | Hayes |
| 6,525,932 B1 | 2/2003 | Ohnishi et al. |
| 6,535,622 B1 | 3/2003 | Russo et al. |
| 6,539,101 B1 | 3/2003 | Black |
| 6,546,122 B1 | 4/2003 | Russo |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,416 B1 | 3/2004 | Xu |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,799,275 B1 | 9/2004 | Bjorn |
| 6,836,230 B2 | 12/2004 | Le Pailleur et al. |
| 6,838,905 B1 | 1/2005 | Doyle |
| 6,862,942 B2 | 3/2005 | Kawahata |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,184,581 B2 | 2/2007 | Johansen et al. |
| 7,190,209 B2 | 3/2007 | Kang et al. |
| 7,190,816 B2 | 3/2007 | Mitsuyu et al. |

(56) References Cited

U.S. PATENT DOCUMENTS

| | | | |
|---|---|---|---|
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujeda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart et al. |
| 7,463,756 B2 | 12/2008 | Benkley |
| 7,474,772 B2 | 1/2009 | Russo et al. |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,599,530 B2 | 10/2009 | Boshra |
| 7,616,787 B2 | 11/2009 | Boshra |
| 7,634,117 B2 | 12/2009 | Cho |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,734,074 B2 | 6/2010 | Setlak et al. |
| 7,751,601 B2 | 7/2010 | Benkley |
| 7,826,645 B1 | 11/2010 | Cayen |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson |
| 8,290,150 B2 | 10/2012 | Erhart et al. |
| 8,315,444 B2 | 11/2012 | Gardner |
| 8,331,096 B2 | 12/2012 | Garcia |
| 8,358,815 B2 | 1/2013 | Benkley et al. |
| 8,374,407 B2 | 2/2013 | Benkley et al. |
| 8,391,568 B2 | 3/2013 | Satyan |
| 8,447,077 B2 | 5/2013 | Benkley et al. |
| RE44,440 E | 8/2013 | Getzin et al. |
| 8,520,913 B2 | 8/2013 | Dean et al. |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0014530 A1 | 2/2002 | Iihama |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0171954 A1 | 11/2002 | Bonardi et al. |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0021786 A1 | 2/2004 | Nakamura et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0073324 A1* | 4/2005 | Umeda et al. ................ 324/662 |
| 2005/0100196 A1 | 5/2005 | Scott et al. |
| 2005/0100938 A1 | 5/2005 | Hofmann et al. |
| 2005/0103611 A1 | 5/2005 | Holscher |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishil et al. |
| 2005/0129291 A1 | 6/2005 | Boshra |
| 2005/0136200 A1 | 6/2005 | Durell et al. |

(56) References Cited

U.S. PATENT DOCUMENTS

| | | |
|---|---|---|
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0057756 A1 | 3/2006 | Sato et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0181521 A1 | 8/2006 | Perrault et al. |
| 2006/0182319 A1 | 8/2006 | Setlank et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1* | 2/2007 | Erhart et al. ............... 382/124 |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0238878 A1 | 10/2008 | Wang |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0130369 A1 | 5/2009 | Huang et al. |
| 2009/0140838 A1 | 6/2009 | Newman et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0117794 A1 | 5/2010 | Adams et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0083018 A1 | 4/2011 | Kesanupalli et al. |
| 2011/0083170 A1 | 4/2011 | Kesanupalli et al. |
| 2011/0090047 A1 | 4/2011 | Patel |
| 2011/0102567 A1 | 5/2011 | Erhart |
| 2011/0102569 A1 | 5/2011 | Erhart |
| 2011/0175703 A1 | 7/2011 | Benkley |
| 2011/0176037 A1 | 7/2011 | Benkley, III |
| 2011/0182486 A1 | 7/2011 | Valfridsson et al. |
| 2011/0214924 A1 | 9/2011 | Perezselsky et al. |
| 2011/0221942 A1 | 9/2011 | Taura |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |
| 2012/0148122 A1 | 6/2012 | Dean et al. |
| 2012/0189166 A1 | 7/2012 | Russo |
| 2012/0189172 A1 | 7/2012 | Russo |
| 2012/0206586 A1 | 8/2012 | Gardner |
| 2012/0256280 A1 | 10/2012 | Erhart |
| 2012/0257032 A1 | 10/2012 | Benkley |
| 2012/0308092 A1 | 12/2012 | Benkley et al. |
| 2013/0021044 A1 | 1/2013 | Thompson et al. |
| 2013/0094715 A1 | 4/2013 | Benkley et al. |
| 2013/0177220 A1 | 7/2013 | Erhart et al. |
| 2013/0258142 A1 | 10/2013 | Russo |

FOREIGN PATENT DOCUMENTS

| | | | |
|---|---|---|---|
| EP | | 0791899 A3 | 8/1997 |
| EP | | 0791899 B1 | 8/1997 |

(56) References Cited

FOREIGN PATENT DOCUMENTS

| | | |
|---|---|---|
| EP | 0929028 A2 | 1/1998 |
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1536368 A1 | 6/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |
| GB | 2474999 B | 2/2013 |
| GB | 2499497 | 8/2013 |
| JP | 01094418 A2 | 4/1989 |
| JP | 04158434 A2 | 6/1992 |
| JP | 2003256820 A | 9/2003 |
| JP | 2005011002 A | 1/2005 |
| JP | 2005242856 | 9/2005 |
| JP | 2006053768 | 6/2006 |
| JP | 2007305097 A | 11/2007 |
| JP | 3569804 B2 | 9/2009 |
| TW | 200606745 A | 2/2006 |
| TW | 200606746 | 2/2006 |
| TW | 200614092 | 5/2006 |
| TW | 200617798 | 6/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 99/46724 A1 | 9/1999 |
| WO | WO/2011/088252 A1 | 1/2001 |
| WO | WO 01/22349 A1 | 3/2001 |
| WO | WO 01/59558 A1 | 8/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Shu, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

Bellagiodesigns.Com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

* cited by examiner

APPARATUS AND METHOD FOR REDUCING NOISE IN FINGERPRINT SENSING CIRCUITS

CROSS-REFERENCE

This application is a continuation of Ser. No. 13/372,153, filed Feb. 13, 2012, now U.S. Pat. No. 8,520,913 B2 issued Aug. 27, 2013, which is a continuation of Ser. No. 12/098,367, filed Apr. 4, 2008, now U.S. Pat. No. 8,116,540, issued Feb. 14, 2012, both entitled "Apparatus and Method for Reducing Noise in Fingerprint Sensing Circuits," which are incorporated herein by reference in its entirety and to which application we claim priority under 35 USC §120.

BACKGROUND

This invention relates to fingerprint sensing technology, and more particularly to apparatus and methods for reducing the effects of noise in fingerprint sensing circuits.

Fingerprint sensing technology is increasingly recognized as a reliable, non-intrusive way to verify individual identity. Fingerprints, like various other biometric characteristics, are based on unalterable personal characteristics and thus are believed to be more reliable when identifying individuals. The potential applications for fingerprints sensors are myriad. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, particularly portable applications, may require electronic fingerprint sensing systems that are compact, highly reliable, and inexpensive.

Various electronic fingerprint sensing methods, techniques, and devices have been proposed or are currently under development. For example, optical and capacitive fingerprint sensing devices are currently on the market or under development. Like a digital camera, optical technology utilizes visible light to capture a digital image. In particular, optical technology may use a light source to illuminate an individual's finger while a charge-coupled device (CCD) captures an analog image. This analog image may then be converted to a digital image.

There are generally two types of capacitive fingerprint sensing technologies: passive and active. Both types of capacitive technologies utilize the same principles of capacitance to generate fingerprint images. Passive capacitive technology typically utilizes an array of plates to apply an electrical current to the finger. The voltage discharge is then measured through the finger. Fingerprint ridges will typically have a substantially greater discharge potential than valleys, which may have little or no discharge.

Active capacitive technology is similar to passive technology, but may require initial excitation of the epidermal skin layer of the finger by applying a voltage. Active capacitive sensors, however, may be adversely affected by dry or worn minutia, which may fail to drive the sensor's output amplifier. By contrast, passive sensors are typically capable of producing images regardless of contact resistance and require significantly less power.

Although each of the fingerprint sensing technologies described above may generate satisfactory fingerprint images, each may be adversely affected by noise, interference, and other effects. For example, capacitive sensors may be particularly susceptible to noise and parasitic capacitive coupling, which may degrade the quality of the acquired fingerprint image. Accordingly, it would be an advance in the art to reduce the effects of noise, parasitic capacitive coupling, and other effects in capacitive-type fingerprint sensing circuits.

BRIEF DESCRIPTION OF THE DRAWINGS

In order that the advantages of the invention will be readily understood, a more particular description of the invention briefly described above will be rendered by reference to specific examples illustrated in the appended drawings. Understanding that these drawings depict only typical examples of the invention and are not therefore to be considered limiting of its scope, the invention will be described and explained with additional specificity and detail through use of the accompanying drawings, in which.

DETAILED DESCRIPTION

Figure 1:
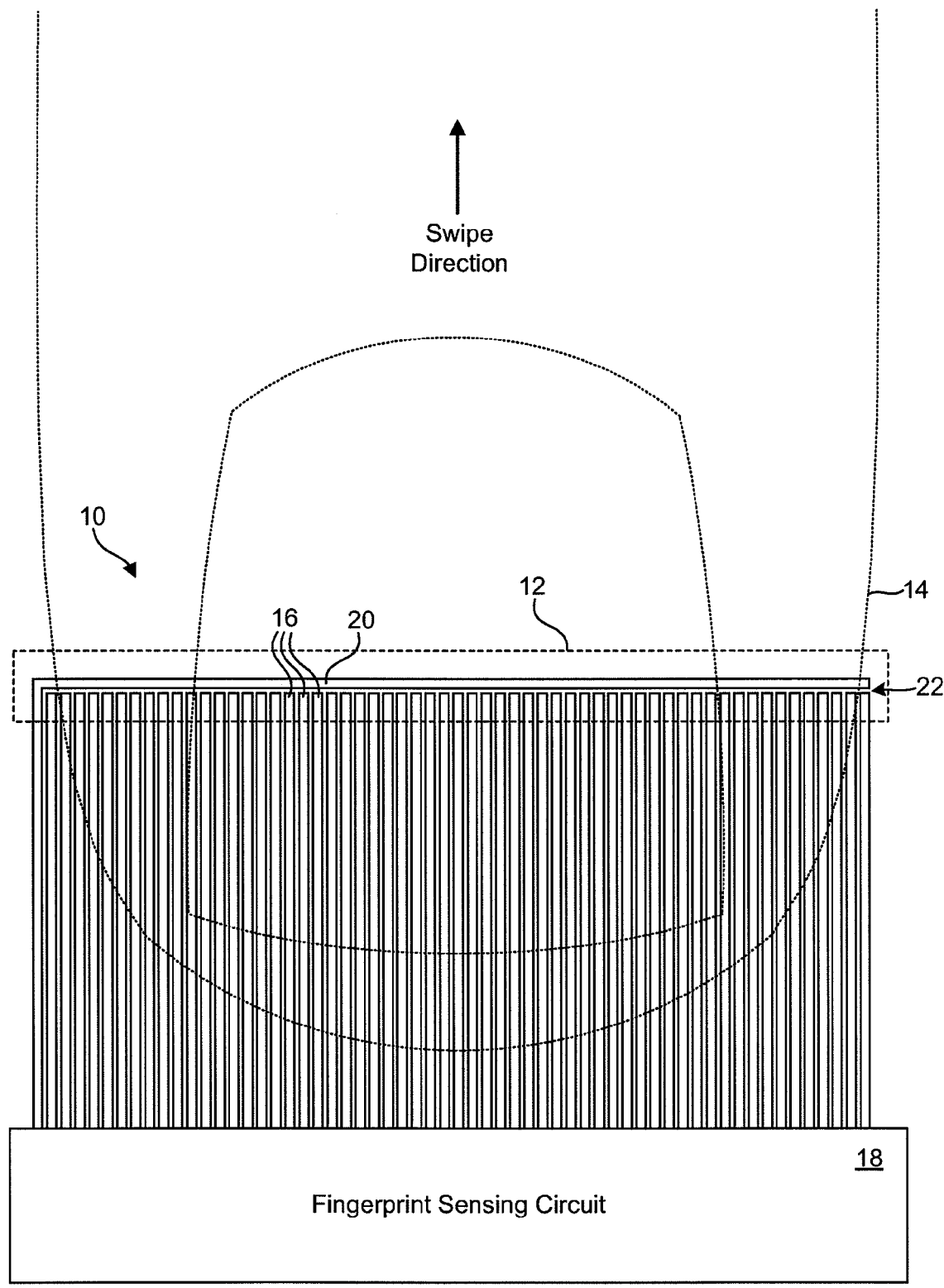
FIG. 1 is a high-level block diagram of one embodiment of a fingerprint sensing area containing an array of fingerprint sensing elements and interfacing with a fingerprint sensing circuit.

The invention has been developed in response to the present state of the art, and in particular, in response to the problems and needs in the art that have not yet been fully solved by currently available fingerprint sensors. Accordingly, the invention has been developed to provide novel apparatus and methods for reducing noise in fingerprint sensing circuits. The features and advantages of the invention will become more fully apparent from the following description and appended claims and their equivalents, and also any subsequent claims or amendments presented, or may be learned by practice of the invention as set forth hereinafter.

Consistent with the foregoing, an apparatus for reducing noise in fingerprint sensing circuits is disclosed in one embodiment of the invention as including a fingerprint sensing area onto which a user can apply a fingerprint. An analog front end is coupled to the fingerprint sensing area and is configured to generate an analog response signal. An analog-to-digital converter (ADC) samples the analog response signal and converts the sample to a digital value, which may be received by a digital device such as a processor or CPU. To reduce the amount of the noise that is present in the analog response signal and therefore reflected in the digital value, the digital device may be shut down while the ADC is sampling the analog response signal.

In selected embodiments, the digital device is shut down by turning off a clock signal to the digital device. In other embodiments, the digital device is shut down by disabling the digital device or turning off power to the digital device. In certain embodiments, the digital device is configured to shut down some interval prior to the time the ADC samples the analog response signal. The interval may be selected to allow any noise to settle out of the system prior to sampling the analog response signal.

In another embodiment in accordance with the invention, a method for reducing noise in a fingerprint sensing circuit may include providing a fingerprint sensing area onto which a user can apply a fingerprint. An analog response signal associated with finger activity over the fingerprint sensing area may then be generated. The method may further include sampling the analog response signal and converting the sample to a digital value. This digital value may then be received by a digital device. To reduce the amount of noise that is present in the analog response signal during sampling and therefore reflected in the digital value, the method may further include shutting down the digital device while sampling the analog response signal.

In another embodiment in accordance with the invention, a method for reducing noise in fingerprint sensing circuits includes providing a fingerprint sensing area onto which a user can apply a fingerprint and generating an analog response signal in response to finger activity over the fingerprint sensing area. The analog response signal is then sampled and converted to a digital value. This digital value may then be received or processed by a CPU. To reduce the amount of the noise that is present in the analog response signal during sampling and reflected in the digital value, the method may further include turning off a clock signal to the CPU while sampling the analog response signal.

It will be readily understood that the components of the present invention, as generally described and illustrated in the Figures herein, may be arranged and designed in a wide variety of different configurations. Thus, the following more detailed description of the embodiments of the systems and methods of the present invention, as represented in the Figures, is not intended to limit the scope of the invention, as claimed, but is merely representative of selected embodiments of the invention.

Some of the functional units or method steps described in this specification may be embodied or implemented as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, in selected embodiments, a fingerprint sensor 10 useable with an apparatus and method in accordance with the invention may include a fingerprint sensing area 12 to provide a surface onto which a user can swipe a fingerprint. A dotted outline of a finger 14 is shown superimposed over the fingerprint sensing area 12 to provide a general idea of the size and scale of one embodiment of a fingerprint sensing area 12. The size and shape of the fingerprint sensing area 12 may vary, as needed, to accommodate different applications.

In certain embodiments, the fingerprint sensing area 12 may include an array of transmitting elements 16, such as a linear array of transmitting elements 16, to assist in scanning lines of "pixels" as a fingerprint is swiped across the fingerprint sensing area 12. In this embodiment, the transmitting elements 16 are shown as a linear array of conductive traces 16 connected to a fingerprint sensing circuit 18. The transmitting elements 16 are not drawn to scale and may include several hundred transmitting elements 16 arranged across the width of a fingerprint, one transmitting element 16 per pixel. A fingerprint image may be generated by scanning successive lines of pixels as a finger is swiped over the array. These lines may then be assembled to generate a fingerprint image, similar to the way a fax image is generated using line-by-line scanning.

In certain embodiments, the transmitting elements 16 are configured to sequentially emit, or burst, a probing signal, one after the other. As will be explained in more detail hereafter, the probing signal may include a burst of probing pulses, such as a burst of square waves. This probing signal may be sensed on the receiving end by a receiving element 20. Like the transmitting elements 16, the receiving element 20 is shown as a conductive trace 20 connected to the fingerprint sensing circuit 18. Although shown as a single receiving element 20, in other embodiments, pairs of receiving elements 20 may be used to differentially cancel out noise.

At the receiving element 20, a response signal may be generated in response to the probing signal. The magnitude of the response signal may depend on factors such as whether a finger is present over the fingerprint sensing area 12 and, more particularly, whether a ridge or valley of a fingerprint is immediately over the gap 22 between a transmitting element 16 and the receiving element 20. The magnitude of the signal generated at the receiving element 20 may be directly related to the RF impedance of a finger ridge or valley placed over the gap 22 between the corresponding transmitting element 16 and receiving element 20.

By using a single receiving element 20 (or a small number of receiving elements 20) and a comparatively larger number of transmitting elements 16, a receiver that is coupled to the receiving element 20 may be designed to be very high quality and with a much better dynamic range than would be possible using an array of multiple receiving elements. This design differs from many conventional fingerprint sensors, which may employ a single large transmitting element with a large array of receiving elements and receivers. Nevertheless, the apparatus and methods described herein are not limited to the illustrated transmitter and receiver design. Indeed, the apparatus and methods disclosed herein may be used with fingerprint sensors using a small number of transmitting elements and a relatively large number of receiving elements, a large number of transmitting elements and a relatively small number of receiving element, or a roughly equal number of transmitting and receiving elements.

As shown in FIG. 1, the fingerprint sensing area 12 (including the transmitting and receiving elements 16, 20) may be physically decoupled from the fingerprint sensing circuit 18. Positioning the sensing elements 16, 20 off the silicon die may improve the reliability of the fingerprint sensor 10 by reducing the sensor's susceptibility to electrostatic discharge, wear, and breakage. This may also allow the cost of the sensor 10 to be reduced over time by following a traditional die-shrink roadmap. This configuration provides a distinct advantage over direct contact sensors (sensors that are integrated onto the silicon die) which cannot be shrunk to less than the width of an industry standard fingerprint. Nevertheless, the apparatus and methods disclosed herein are applicable to fingerprint sensors with sensing elements that are located either on or off the silicon die.

Figure 2:
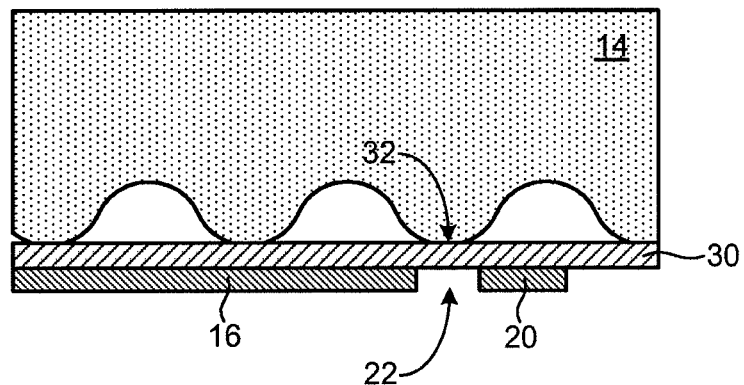
FIG. 2 is a partial cutaway profile view of a fingerprint sensing area showing the interaction between a finger and fingerprint sensing elements in a capacitive-type fingerprint sensor, with a fingerprint ridge lying substantially over the sensor gap.
Figure 3:
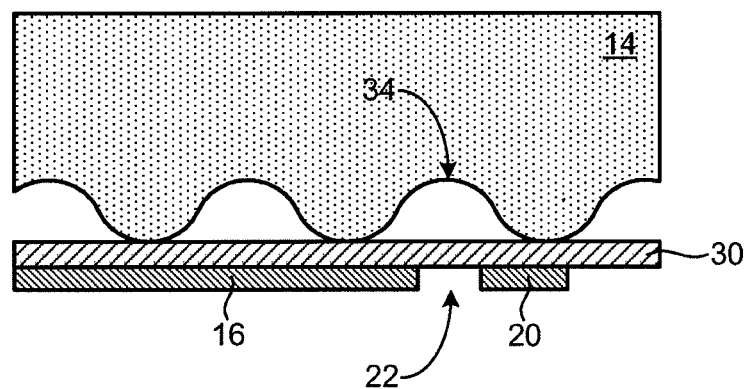
FIG. 3 is a partial cutaway profile view of a fingerprint sensing area showing the interaction between a finger and fingerprint sensing elements in a capacitive-type fingerprint sensor, with a fingerprint valley lying substantially over the sensor gap.

Referring generally to FIGS. 2 and 3, in selected embodiments, the transmitting and receiving elements 16, 20 discussed above may be adhered to a non-conductive substrate 30. For example, the substrate 30 may be constructed of a flexible polyimide material marketed under the trade name Kapton® and with a thickness of between about 25 and 100 μm. The Kapton® polymer may allow the fingerprint sensor 10 to be applied to products such as touchpads and molded plastics having a variety of shapes and contours while providing exceptional durability and reliability.

In selected embodiments, a user's finger may be swiped across the side of the substrate 30 opposite the transmitting and receiving elements 16, 20. Thus, the substrate 30 may electrically and mechanically isolates a user's finger from the transmitting element 16 and receiving element 20, thereby providing some degree of protection from electrostatic discharge (ESD) and mechanical abrasion.

The capacitive coupling between the transmitting element 16 and the receiving element 20 may change depending on whether a fingerprint ridge or valley is immediately over the gap 22. This is because the dielectric constant of a finger is typically ten to twenty times greater than the dielectric constant of air. The dielectric constant of the ridges of a finger may vary significantly from finger to finger and person to person, explaining the significant range of dielectric constants. Because a fingerprint ridge has a dielectric constant that differs significantly from that of air, the capacitive coupling between the transmitting element 16 and receiving element 20 may vary significantly depending on whether a ridge or valley is present over the sensor gap 22.

For example, referring to FIG. 2, when a fingerprint ridge 32 is over the gap 22, the capacitive coupling between the transmitting element 16 and receiving element 20 may be increased such that the probing signal emitted by the transmitting element 16 is detected at the receiving element 20 as a stronger response signal. It follows that a stronger response signal at the receiving element 20 indicates the presence of a ridge 32 over the gap 22. On the other hand, as shown in FIG. 3, the capacitive coupling between the transmitting element 16 and receiving element 20 may decrease when a valley is present over the gap 22. Thus, a weaker response signal at the receiving element 20 may indicate that a valley 34 is over the gap 22. By measuring the magnitude of the response signal at the receiving element 20, ridges and valleys may be detected as a user swipes his or her finger across the sensing area 12, allowing a fingerprint image to be generated.

Figure 4:
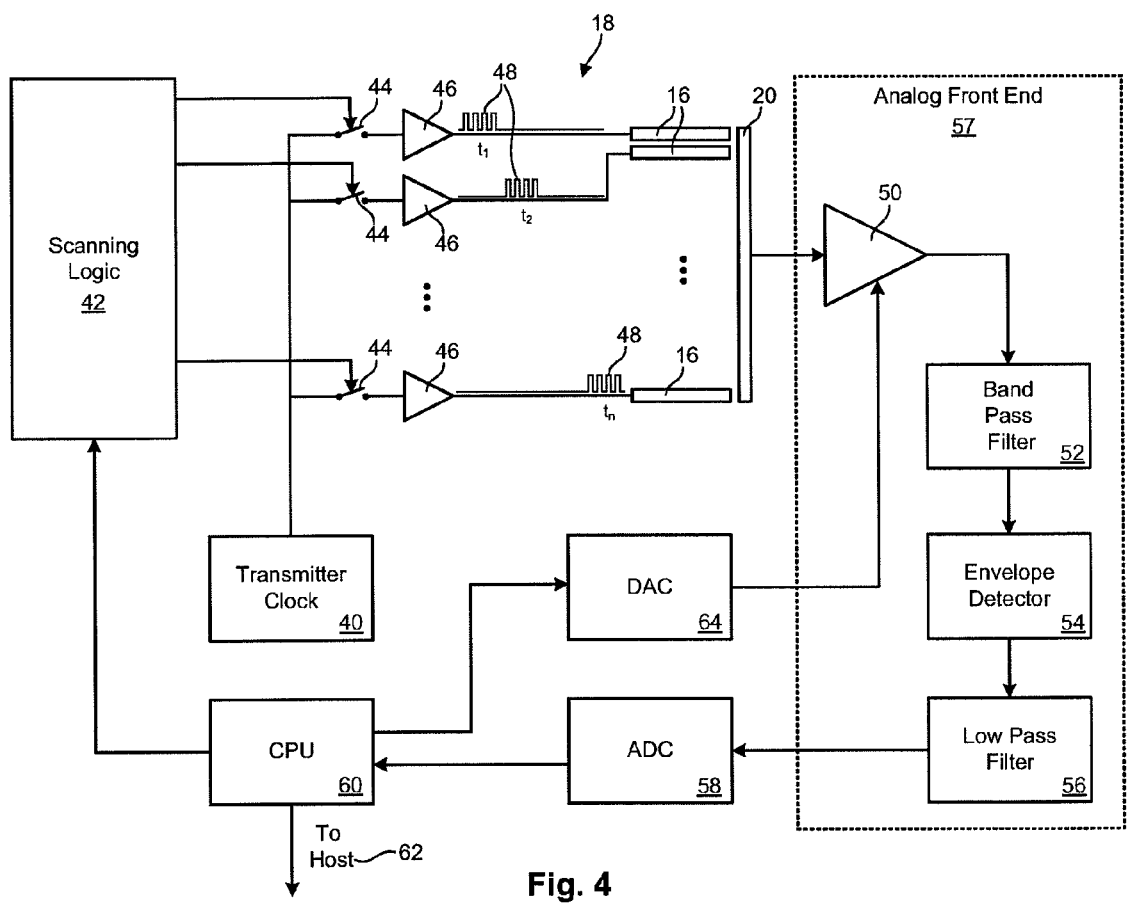
FIG. 4 is a high-level block diagram of one embodiment of a fingerprint sensing circuit for use with the present invention.

Referring to FIG. 4, in certain embodiments, a fingerprint sensing circuit 18 useable with an apparatus and method in accordance with the invention may include a transmitter clock 40 configured to generate an oscillating signal, such as an oscillating square-wave signal. Scanning logic 42 may be used to sequentially route the oscillating signal to buffer amplifiers 46, one after the other, using switches 44. The buffer amplifiers 46 may amplify the oscillating signal to generate the probing signal. As shown, the buffer amplifiers 46 may sequentially burst the probing signal 48 to each of the transmitting elements 16, one after the other. A response signal, generated in response to the probing signal 48, may be sensed at the receiving element 20 and may be routed to a variable-gain amplifier 50 to amplify the response signal. The amplified response signal may then be passed to a band pass filter 52 centered at the frequency of the transmitter clock 40.

The output from the band pass filter 52 may then be supplied to an envelope detector 54, which may detect the envelope of the response signal. This envelope may provide a baseband signal, the amplitude of which may vary depending on whether a ridge or valley is over the sensor gap 22. The baseband signal may be passed to a low pass filter 56 to remove unwanted higher frequencies. The variable-gain amplifier 50, band pass filter 52, envelope detector 54, low pass filter 56, as well as other analog components may be collectively referred to as an analog front end 57.

The output from the low pass filter 56 may be passed to an analog-to-digital converter (ADC) 58, which may convert the analog output to a digital value. The ADC 58 may have, for example, a resolution of 8 to 12 bits and may be capable of resolving the output of the low pass filter 56 to 256 to 4096 values. The magnitude of the digital value may be proportional to the signal strength measured at the receiving element 20. Likewise, as explained above, the signal strength may be related to the capacitive coupling between the transmitting element 16 and receiving element 20, which may depend on the RF impedance of the feature over the sensor gap 22.

The resulting digital value may be passed to a CPU 60 or other digital components, which may eventually pass digital fingerprint data to a host system 62. The host system 62, in selected embodiments, may process the fingerprint data using various matching algorithms in order to authenticate a user's fingerprint.

In addition to processing the digital data, the CPU 60 may control the gain of the variable-gain amplifier 50 using a digital-to-analog converter (DAC) 64. The gain may be adjusted to provide a desired output power or amplitude in the presence of variable sensing conditions. For example, in selected embodiments, the gain of the variable-gain amplifier 50 may be adjusted to compensate for variations in the impedance of different fingers. In selected embodiments, the CPU 60 may also control the operation of the scanning logic 42.

Figure 5:
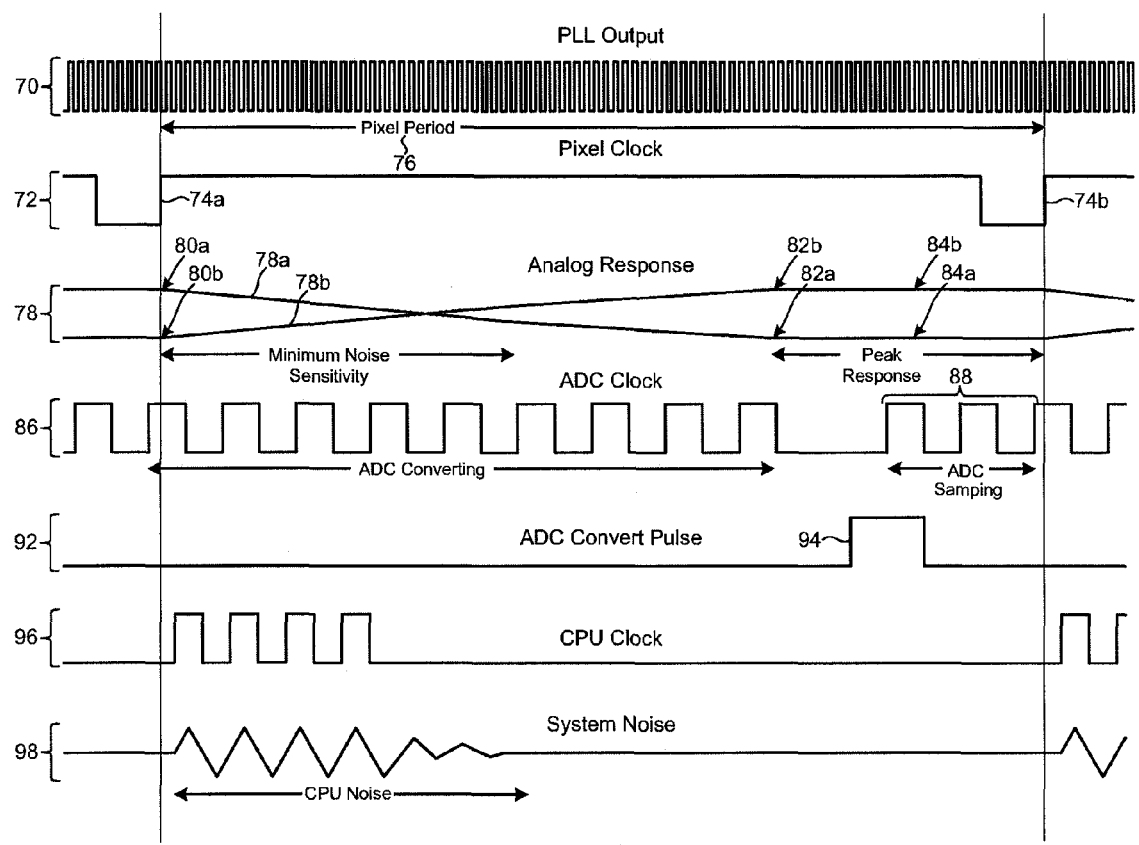
FIG. 5 is a timing diagram showing an example of various signals that may exist within a fingerprint sensing circuit useable with the present invention.

Referring to FIG. 5, a timing diagram is illustrated to describe various signals that may occur within the fingerprint sensing circuit 18 of FIG. 4. In selected embodiments, the fingerprint sensing circuit 18 may include a phase-locked loop (PLL) output 70 which may provide the master reference signal to drive many of the components in the fingerprint sensing circuit 18. In certain embodiments, the PLL output 70 may be derived from a lower frequency crystal input that is multiplied to generate the PLL output 70. As will be explained in more detail in association with FIG. 6, the PLL output 70 may be divided down to provide clocking signals to different components in the fingerprint sensing circuit 18.

A pixel clock signal 72 may control the amount of time each transmitting element 16 is transmitting the probing signal 48. For example, a rising edge 74a of the pixel clock signal 72 may cause a first transmitting element 16 in the array to begin emitting the probing signal 48. The next rising edge 74b may cause the first transmitting element 16 to cease transmitting and cause the next transmitting element 16 to begin emitting the probing signal 48. This process may continue for each transmitting element 16 in the array to generate a "line" of fingerprint data. Successive lines may be scanned in this manner and the lines may be combined to generate a fingerprint image as previously discussed. The interval between the rising edges 74a, 74b may be referred to as the "pixel period" 76.

Analog response signals 78a, 78b may represent the signal that is output from the analog front end 57 described in FIG. 4. A first analog response signal 78a may reflect the response that occurs when a ridge transitions to a valley over the sensing gap 22. A second analog response signal 78b may reflect the response that occurs when a valley transitions to a ridge over the sensing gap 22.

As shown, the first analog response signal 78a may initially have a magnitude 80a when a ridge is placed over the sensor gap 22 (reflecting greater capacitive coupling between the transmitting and receiving elements 16, 20). When the ridge is removed from the sensor gap 22 (i.e., a valley is placed over the sensor gap 22), the magnitude 82a of the signal 78a may become smaller (reflecting reduced capacitive coupling between the transmitting and receiving elements 16, 20). The gradual transition between the peak magnitudes 80a, 82a may be the result of time constants of analog components in the fingerprint sensing circuit 18. That is, due to the frequency response of analog components, such as band pass and low pass filters 52, 56, some time may be needed for the signal 78a to settle at a new level. After the signal 78a has transitioned from one peak value 80a to the other 82a, the signal 78a may reach a substantially steady state level 84a. Sampling is ideally conducted during this period.

Similarly, the second analog response signal 78b may initially have a magnitude 80b when a valley is placed over the sensor gap 22 (reflecting lower capacitive coupling between the transmitting and receiving elements 16, 20). When a ridge is placed over the sensor gap 22, the magnitude 82b of the signal 78b may become larger (reflecting increased capacitive coupling between the transmitting and receiving elements 16, 20). The signal may transition between the peak magnitudes 80b, 82b, reflecting time constants in the fingerprint sensing circuit 18, after which the signal 78b may reach a substantially steady state level 84b.

An ADC clock signal 86 may be used to clock the ADC 58 in the fingerprint sensing circuit 18. In this example, the ADC 58 uses three clock cycles 88 to sample the voltage of the analog response signal 78a, 78b and eight clock cycles to convert the sample to a digital value. In certain embodiments, the ADC 58 may open a gate and store the sample on a capacitor for about three clock cycles. After the three clock cycles have passed, the ADC 58 may close the gate and convert the sample to a digital value. In certain embodiments, the ADC 58 may use one clock cycle to generate each bit of the digital value. The number of clock cycles used for sampling and converting is presented only by way of example and is not intended to be limiting. As shown, sampling may be performed during the steady state period 84a, 84b (i.e., the peak response period) to generate the most accurate sample.

In selected embodiments, an ADC convert pulse signal 92 may be used to instruct the ADC 58 to begin sampling. For example, when an edge, such as a rising edge 94, of the ADC convert pulse signal 92 is detected by the ADC 58, the ADC 58 may begin to sample the analog response signal 78a, 78b and convert the sample to a digital value.

A CPU clock signal 96 may be used to clock the CPU 60 and other digital components in the fingerprint sensing circuit 18. As shown, in selected embodiments, the clock signal 96 may be configured to operate during an initial portion of the pixel period 76 (the period of minimum noise sensitivity) but may be shut down during the remainder of the pixel period 76. This may be performed to reduce system noise (e.g., switching noise produced by the CPU 60 or other digital components when they change state) in the fingerprint sensing circuit 18 when the ADC 58 is sampling the analog response signal 78. This will ideally reduce the amount of noise that is reflected in the digital value, allowing a clearer fingerprint image to be generated.

The signal 98 may represent noise that is generated in the fingerprint sensing circuit 18 when the CPU clock 96 is turned on. By shutting off the CPU clock 96 at an appropriate time, noise may be allowed to settle out of the system prior to sampling the analog response signal 78. Thus, in selected embodiments, the CPU clock 96 may be shut down some interval prior to the time the ADC 58 samples the analog response signal 78 in order to allow time for noise to settle out of the system.

In alternative embodiments, instead of shutting down the CPU clock 96 while sampling the analog response signal 78, other actions may be taken to reduce noise in the fingerprint sensing circuit 18. For example, the CPU 60 itself may be disabled or shut down when sampling the analog response signal 78, and then re-enabled or re-started once sampling is complete.

Figure 6:
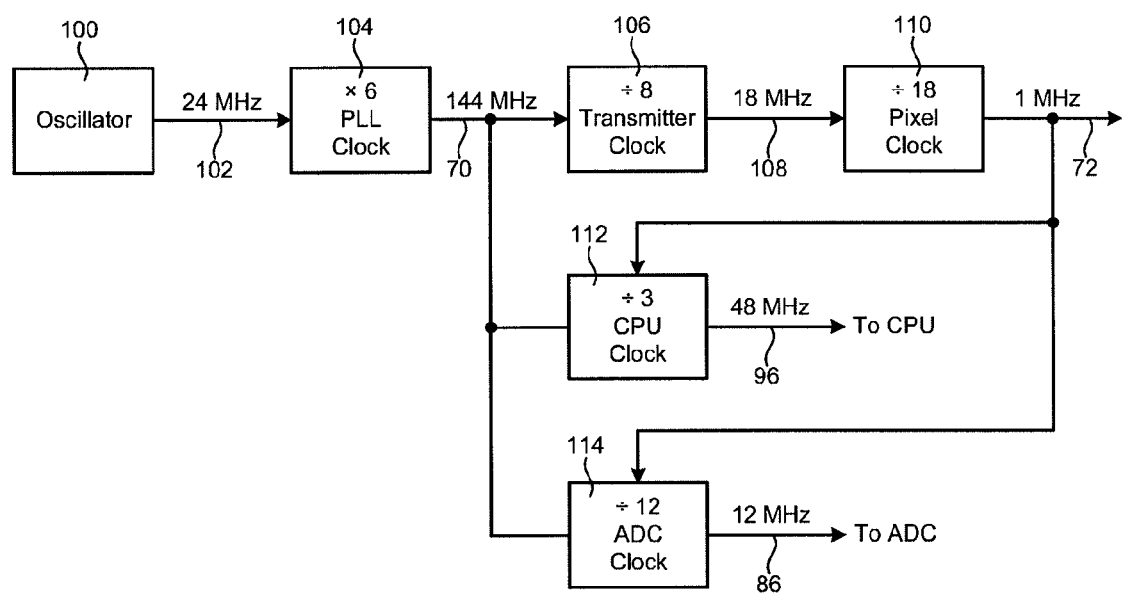
FIG. 6 is a high-level block diagram showing an example of an oscillator, multipliers, dividers, and the like that may be used to generate the signals of FIG. 5.

Referring to FIG. 6, in order to generate the signals described in FIG. 5, in selected embodiments, an oscillator 100, such as a crystal oscillator 100, may be used to provide a stable clock signal 102. In this example, the oscillator produces a 24 MHz output signal. A frequency multiplier 104 or phase-locked loop circuit 104 may multiply the oscillator frequency to generate the PLL output 70, as previously discussed. In this example, the PLL output 70 is a 144 MHz signal. This output 70 may provide a master reference signal to drive many of the components in the fingerprint sensing circuit 18.

As mentioned, the PLL output 70 may be divided to generate clocking signals to clock different components in the fingerprint sensing circuit 18. For example, in selected embodiments, a frequency divider 106 may divide the PLL output frequency 70 to generate a probing signal frequency 108, in this example 18 MHz. This signal 108 may be divided further to generate the pixel clock signal 72, in this example a 1 MHz signal.

Similarly, the PLL output 70 may be divided to provide clock signals 96, 86 for the CPU 60 and ADC 58, respectively. In this example, a divider 112 may divide the PLL output 70 to generate a CPU clock signal 96, in this example a 48 MHz signal 96. Similarly, a divider 114 may divide the PLL output 70 to generate an ADC clock signal 86, in this example a 12 MHz signal 86.

In selected embodiments, the CPU clock 112 and ADC clock 114 may receive input from the pixel clock 72. For example, a rising or falling edge of the pixel clock 72 may cause the CPU clock 112 and ADC clock 114 to begin outputting the CPU clock signal 96 and ADC clock signal 86, respectively. In selected embodiments, the CPU clock 112 and ADC clock 114 are programmable with respect to how many clock pulses to output and a delay before outputting the clock pulses. Thus, when the CPU clock 112 and ADC clock 114 receive a a rising or falling edge from the pixel clock 110, they may output a specified number of clock pulses starting at a specified time as determined by the delay. In this way, the CPU clock 96 may be shut down during selected portions of the pixel period 76, and more particularly while the ADC 58 is sampling the analog response signal 78.

It should be recognized that the components and frequencies illustrated in FIG. 6 simply represent one embodiment of an apparatus and method for implementing the invention as discussed herein. Thus, the illustrated components and frequencies are presented only by way of example and are not intended to be limiting. Similarly, the signals illustrated in FIG. 5 are presented only by way of example and are not intended to be limiting.

Similarly, apparatus and methods in accordance with the invention are applicable to a wide variety of fingerprint sensing technologies are not limited to the fingerprint sensing technology disclosed herein. Indeed, the apparatus and methods may be applicable to a wide variety of capacitive, optical, ultrasonic, and other fingerprint sensing technologies where noise may be a concern. Each of these technologies may benefit from reduced noise by turning off clocks to various components during sampling, or by shutting down or disabling selected components during sampling. Thus, apparatus and methods are not limited to any specific type of fingerprint sensor but may be applicable to a wide variety of fingerprint sensing technologies.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A biometric sensing apparatus comprising:
   an analog sensor having image pixel locations, each image pixel location sensed during a respective image pixel sensing time period, to provide an analog response representative of the condition of an image pixel at the image pixel location being sampled during the image pixel sensing time period;
   an analog to digital converter connected to the analog output of the image pixel at the image pixel location and configured to sample the analog response for the image pixel at the image pixel location during the respective image pixel sensing time period;
   a digital component having digital circuitry at least indirectly coupled to the analog to digital converter during at least a portion of the image pixel sensing time period;
   an analog to digital converter timing circuit configured to activate conversion of a sampled analog response for a prior image pixel location sampled during a prior image pixel location sensing time period, in order to form a digital response for the prior image pixel location sampled during the prior image pixel sensing time, during a conversion time period portion of the image pixel sensing time period at the same time as the analog to digital converter is receiving the analog output of the image pixel at the image pixel location, and to activate sampling of the analog response for the image pixel location being sampled during an image pixel sampling time portion of the image pixel sensing time period, the sampling time portion of the image pixel sensing time period being selected to follow the conversion time period and to allow the analog response sampled during the image pixel sampling time portion of the image pixel sensing time period to have substantially reached steady state during the image pixel sensing time period;
   a digital component timing circuit configured to activate the digital component during a selected portion of the conversion time period and not to activate the digital component during the image pixel sampling time portion of the image pixel sensing time period.

2. The biometric sensing apparatus of claim 1, wherein the biometric comprises an image of a fingerprint of a finger sampled by the biometric sensing apparatus.

3. The biometric sensing apparatus of claim 2 further comprising:
   a transmitter element and a receiver element forming the image pixel at the image pixel location, the image pixel sensing time period defining a time during which the transmitter element and the receiver element for the image pixel at the image pixel location interact to form the analog response representative of the condition of the image pixel location being sampled during the image pixel sensing time period.

4. The biometric sensing apparatus of claim 1 further comprising:
   the selected portion of the conversion time period being selected to allow noise induced by the digital component to substantially die out before the initiation of the image pixel sampling portion of the image pixel sensing time period.

5. The biometric sensing apparatus of claim 1 further comprising:
   the selected portion of the conversion time being selected to activate the digital component while the analog to digital converter is in the beginning stages of converting the analog response to the digital response and lesser significant bits of the digital response are being determined by the analog to digital converter.

6. The biometric sensing apparatus of claim 1 further comprising:
   the digital component comprising a processor processing the digital response.

7. The biometric sensing apparatus of claim 1 further comprising:
   the digital component comprising a processor receiving the digital response.

8. The biometric sensing apparatus of claim 1 further comprising:
   the digital component comprising a controller for the biometric sensing apparatus.

9. The biometric sensing apparatus of claim 1 further comprising:
the digital component comprising a controller for the analog to digital converter.

10. The biometric sensing apparatus of claim 1 further comprising:
the image pixel locations forming one of a one dimensional linear sensor array or a two dimensional grid sensor array.

11. The biometric sensing apparatus of claim 10 further comprising:
the one of the one dimensional linear sensor array or two dimensional grid sensor array being physically decoupled from a sensing apparatus integrated circuit controller.

12. The biometric sensing apparatus of claim 10 further comprising:
the one of the one dimensional linear sensor array or two dimensional grid sensor array being located off of a sensing apparatus integrated circuit controller die.

13. The biometric sensing apparatus of claim 1 further comprising:
the sensing apparatus being integrated with an access control mechanism for one of a security physical checkpoint, a portable computer, a personal data assistant, a cell phone, a gaming device, a navigation device, an information appliance or a data storage device.

14. A method of sensing a biometric image comprising:
sensing an analog response representative of a condition of an image pixel at an image pixel location by using an analog sensor having image pixel locations, each image pixel location being sensed during a respective image pixel sensing time period, to provide the analog response for the image pixel at the image pixel location being sampled during the image pixel sensing time period;
sampling the analog response for the image pixel at the image pixel location during the respective image pixel sensing time period using an analog to digital converter connected to the analog output of the image pixel at the image pixel location;
coupling a digital component having digital circuitry at least indirectly to the analog to digital converter during at least a portion of the image pixel sensing time period;
activating conversion of a sampled analog response for a prior image pixel location sampled during a prior image pixel location sensing time period, in order to form a digital response for the prior image pixel location sampled duringthe prior image pixel sensing time period, during a conversion time period portion of the image pixel sensing time period at the same time as the analog to digital converter is receiving the analog output of the image pixel at the image pixel location, and activating sampling of the analog response for the image pixel location being sampled during an image pixel sampling time portion of the image pixel sensing time period, the sampling time portion of the image pixel sensing time period being selected to follow the conversion time period and to allow the analog response sampled during the image pixel sampling time portion of the image pixel sensing time period to have substantially reached steady state during the image pixel sensing time period;
activating the digital component during a selected portion of the conversion time period and not activating the digital component during the image pixel sampling time portion of the image pixel sensing time period.

15. The biometric sensing method of claim 14, wherein the biometric comprises an image of a fingerprint of a finger sampled by the biometric sensing method.

16. The biometric sensing method of claim 15 further comprising:
forming the image pixel at the image pixel location with a transmitter element and a receiver element, the image pixel sensing time period defining a time during which the transmitter element and the receiver element for the image pixel at the image pixel location interact to form the analog response representative of the condition of the image pixel location being sampled during the image pixel sensing time period.

17. The biometric sensing method of claim 14 further comprising:
the selected portion of the conversion time period being selected to allow noise induced by the digital component to substantially die out before the initiation of the image pixel sampling portion of the image pixel sensing time period.

18. The biometric sensing method of claim 14 further comprising:
the selected portion of the conversion time being selected to activate the digital component while the analog to digital converter is in the beginning stages of converting the analog response to the digital response and lesser significant bits of the digital response are being determined by the analog to digital converter.

19. The biometric sensing method of claim 14 further comprising:
the digital component comprising a processor processing the digital response.

20. The biometric sensing method of claim 14 further comprising:
the digital component comprising a processor receiving the digital response.

21. The biometric sensing method of claim 14 further comprising:
the digital component comprising a controller for the biometric sensing apparatus.

22. The biometric sensing method of claim 14 further comprising:
the digital component comprising a controller for the analog to digital converter.

23. The biometric sensing method of claim 14 further comprising:
the image pixel locations forming one of a one dimensional linear sensor array or a two dimensional grid sensor array.

24. The biometric sensing method of claim 23 further comprising:
the one of the one dimensional linear sensor array or two dimensional grid sensor array being physically decoupled from a sensing apparatus integrated circuit controller.

25. The biometric sensing method of claim 23 further comprising:
the one of the one dimensional linear sensor array or two dimensional grid sensor array being located off of a sensing apparatus integrated circuit controller die.

26. The biometric sensing method of claim 14 further comprising:
the sensing apparatus being integrated with an access control mechanism for one of a security physical checkpoint, a portable computer, a personal data assistant, a cell phone, a gaming device, a navigation device, an information appliance or a data storage device.

27. A tangible machine readable medium storing instructions that, when executed by a computing device cause the computing device to perform a method, the method comprising:
- sensing an analog response representative of a condition of an image pixel at an image pixel location by using an analog sensor having image pixel locations, each image pixel location being sensed during a respective image pixel sensing time period, to provide the analog response for the image pixel at the image pixel location being sampled during the image pixel sensing time period;
- sampling the analog response for the image pixel at the image pixel location during the respective image pixel sensing time period using an analog to digital converter connected to the analog output of the image pixel at the image pixel location;
- coupling a digital component having digital circuitry at least indirectly to the analog to digital converter during at least a portion of the image pixel sensing time period;
- activating conversion of a sampled analog response for a prior image pixel location sampled during a prior image pixel location sensing time period, in order to form a digital response for the prior image pixel location sampled duringthe prior image pixel sensing time, during a conversion time period portion of the image pixel sensing time period at the same time as the analog to digital converter is receiving the analog output of the image pixel at the image pixel location, and activating sampling of the analog response for the image pixel location being sampled during an image pixel sampling time portion of the image pixel sensing time period, the sampling time portion of the image pixel sensing time period being selected to follow the conversion time period and to allow the analog response sampled during the image pixel sampling time portion of the image pixel sensing time period to have substantially reached steady state during the image pixel sensing time period;
- activating the digital component during a selected portion of the conversion time period and not activating the digital component during the image pixel sampling time portion of the image pixel sensing time period.

* * * * *